United States Patent [19]

Godin

[11] 4,171,683
[45] Oct. 23, 1979

[54] INTEGRATED MODULAR ASSEMBLY FACILITATING COHABITATION WITH HOUSE PETS

[76] Inventor: Jean-Paul Godin, 122 Boulevard Murat, 75016 Paris, France

[21] Appl. No.: 794,074

[22] Filed: May 5, 1977

[30] Foreign Application Priority Data

May 7, 1976 [FR] France ................ 76 13680

[51] Int. Cl.² ............................................. A01K 1/00
[52] U.S. Cl. ................................................... 119/15
[58] Field of Search ........................................ 119/15

[56] References Cited

U.S. PATENT DOCUMENTS

| 511,272 | 12/1893 | Hughes | 119/15 |
| 1,773,141 | 8/1930 | Hodgson | 119/15 |
| 2,821,165 | 1/1958 | Wright | 119/15 |
| 3,108,569 | 10/1963 | Kundikoff | 119/15 X |

Primary Examiner—Russell R. Kinsey
Assistant Examiner—Daniel J. Leach
Attorney, Agent, or Firm—Steinberg & Blake

[57] ABSTRACT

An integrated modular assembly for facilitating cohabitation with house pets, particularly cats and dogs, who normally live under conditions of semi-freedom in the lodgings of their master. The assembly includes a movable support which may even be transportable, and a collection of interchangeable modules carried by the support and fulfilling a number of functions among which are required arrangement in a given space, fulfilling bodily conveniences, stimulating instincts and/or simulating a presence, with the combination of selected modules responding to the particular needs of a given house pet for providing for the house pet a territorial refuge, vital comforts, mental and physical exercise, and/or friendship.

10 Claims, 6 Drawing Figures

U.S. Patent  Oct. 23, 1979  Sheet 2 of 2  4,171,683
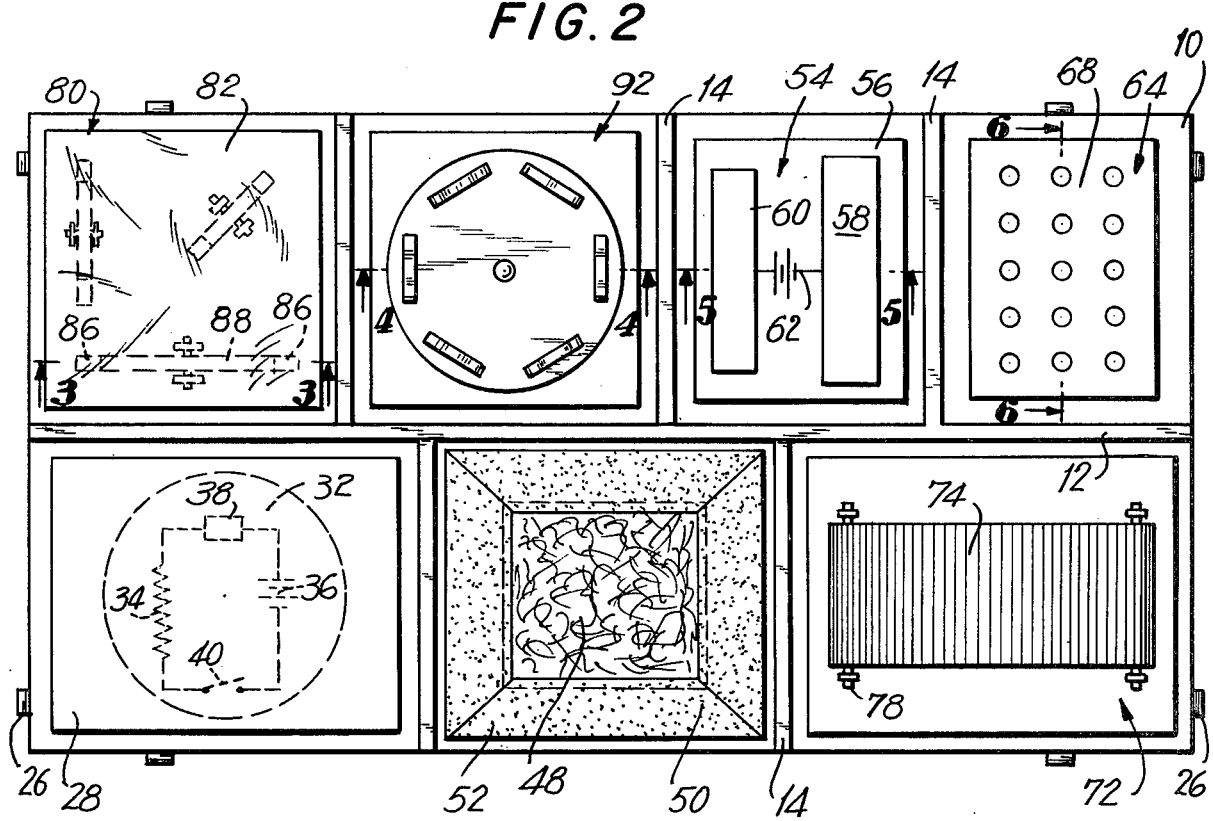
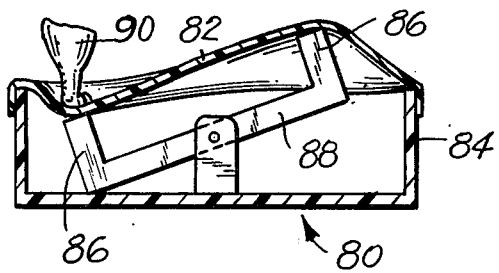
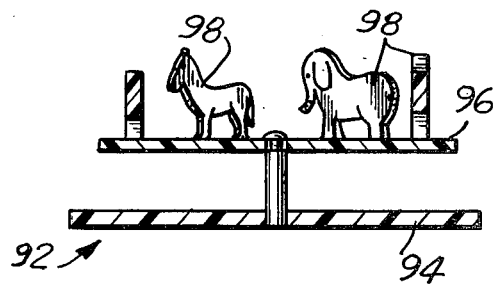
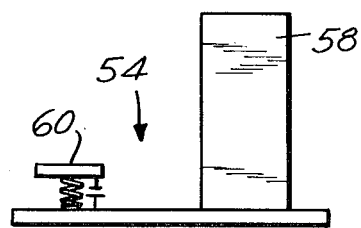

INTEGRATED MODULAR ASSEMBLY FACILITATING COHABITATION WITH HOUSE PETS

BACKGROUND OF THE INVENTION

The present invention relates in a general way to devices and installations for accommodating living animals, and is particularly concerned with an integrated assembly designed specifically to facilitate cohabitation with house pets, particularly cats and dogs, who normally live under conditions of semi-freedom in the lodgings of their master.

In most countries, and particularly in industrial countries where life is for the most part urban, many people seek to alleviate their solitude or lack of natural environment by way of the company of a cat, a dog, or another familiar house pet. In France, for example, the total number of such house pets is in the millions.

It is known that large numbers of cats and dogs are maintained for the sole pleasure of their masters while being condemned to lonely lives in apartments or homes which can only provide such animals with an environment very different from their natural habitat, since such environments are specifically adapted for human needs in unnatural surroundings.

In practice, the only concessions made in connection with the presence of house pets who permanently reside with their masters consist in putting at the disposition of such house pets simple objects such as mats, cushions or baskets for sleeping, litter boxes, scratch boards, or doors provided with special openings for such animals, and various playthings such as balls or bones made of rubber or plastic, as well as special edible products including tins of cat or dog food, preparations simulating natural foods, the sales volume of which surpasses the sales volume of food for babies or the protein requirements of underdeveloped countries.

In particular, there is at the present time no available equipment especially designed for use by such a house pet in the absence of his master or, on the contrary, for maintaining the private needs of such an animal in the presence of their master.

As a result, such animals are compelled to conform to the life style of their master, which can be irregular and even incompatible with the requirements of the animals themselves. Abandoned to himself, such an animal risks a life of boredom and deterioration, or on the other hand disturbs the peacefulness of his master's lack of occupation. On the other hand, in the presence of unknown individuals and in the absence of any refuge, such animals are likely to get in the way and even to become aggressive.

Finally, the artificial life style imposed on such animals, and in particular the isolation of such animals from companions and the absence of stimulation responding to the natural needs of such animals, such as their instincts for chase or play, are likely to diminish the physical and intellectual capabilities of such animals, as has been demonstrated by numerous experimental studies concerning the influence of the environment on animal behavior.

In summary, the lack of equipment capable of satisfying the needs of house pets living in human habitations is likely to result in unstable animal behavior which deprives the master of the important pleasure resulting from the friendly presence of an animal, with the cohabitation with such an animal even becoming insupportable and as a result leading to improper treatment of the animal and even illegal and immoral abandoning of the animal.

SUMMARY OF THE INVENTION

It is accordingly a primary object of the present invention to provide a structure which will alleviate the above deficiencies.

In particular, it is an object of the present invention to provide a relatively complex equipment, as opposed to a simple object, designed to place at the disposition of a house pet living freely but confined in an artificial environment a collection of material devices which respond to the essential needs of the animal with a view to preserving the tranquility of masters, present or absent, and as a result leading to mutual pleasant relationships between man and animal.

There are three orders of essential needs for animals:

In the first place, and most importantly, an animal requires a refuge which forms a mini-territory, in the ecological sense of the term, with the animal having the sole ownership of such a territory where the animal can, as a result, feel perfectly secure and sheltered from all exterior sources of disturbance while being surrounded by objects which provide familiar sensual impressions.

Secondly, for the subsistance and comfort of the animal as well as for achieving freedom of action for his master, there should be placed at the permanent disposition of the animal, to be used according to his individual inclinatons, all of the means required to satisfy the natural animal needs of hygiene, nourishment, and exercise.

Lastly, it is desirable to offer the animal the free use of articles of play or stimulation so as to enable the animal to make use of his natural instincts and, in the absence of the master, to benefit from the output of items which are a substitute for companionship.

The satisfying of the above requirements enables the house pet to retain the spontaneity of his behavior, which in fact forms the basis of his attraction, and in addition supports the acquisition of mutual habits which form the basis of the friendship. As a result, it is possible for the owner of such an animal to enjoy without constraint the pleasure of the presence of the pet, without needing to fear any servitude to the animal, or any servitude in connection with maintaining the animal and in connection with the requirements which have involved up to the present time cohabitation with a house pet.

It is furthermore an object of the invention to satisfy the above needs by way of a modular type of equipment which can easily be modified according to the particular animal and its environment, while at the same time the equipment of the invention is easily transportable so as to avoid subjecting the animal to any brutal deprival of territory, as occasioned, for example, during periods of vacation or change of domicile.

According to the invention, an integrated assembly for facilitating cohabitation with house pets, particularly cats and dogs, who normally live under semi-free conditions in the lodgings of their master, includes a movable support means and a plurality of module means interchangeably carried by the movable support means for fulfilling a number of functions which include arrangement in available space, provision of bodily conveniences, stimulation of instincts and/or simulation of a presence, with the plurality of module means being selectively combinable for providing for a given house pet specific needs which include territorial refuge, vital comforts, physical and mental exercise, and/or friendship.

BRIEF DESCRIPTION OF DRAWINGS

The invention is illustrated by way of example in the accompanying drawings which form part of this application and in which:

FIG. 2 is a top plan view of the integrated assembly of modules of FIG. 1 as it appears when looking downwardly on the structure beneath the cover which is shown in FIG. 1; and FIGS. 3-6 are respectively sectional elevations taken along lines 3—3, 4—4, 5—5, and 6—6 of FIG. 2 in the directions of the arrows and showing schematically details of various different modules which form part of the modules shown in FIG. 2.

DESCRIPTION OF PREFERRED EMBODIMENTS

Figure 1:
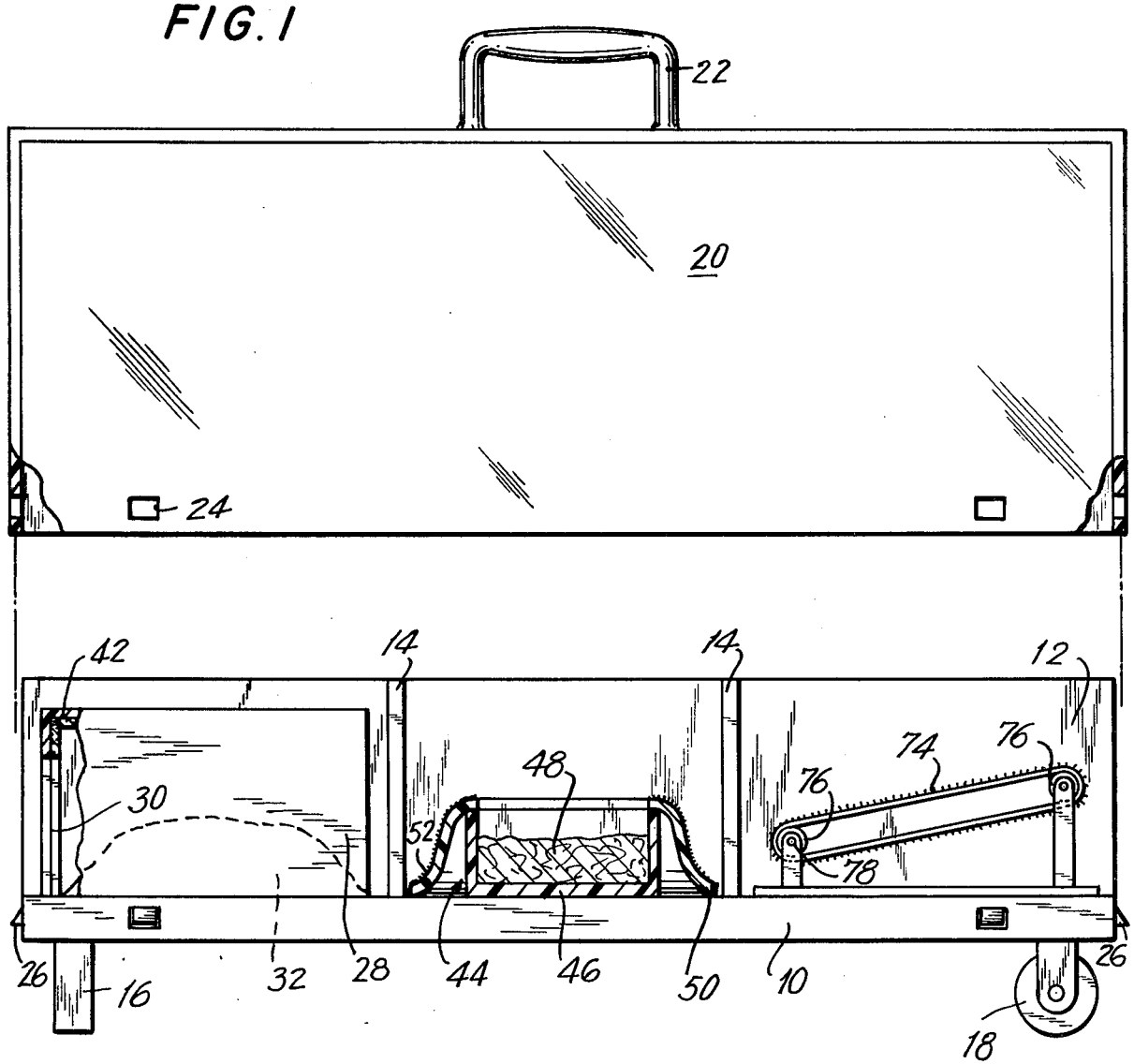
FIG. 1 is a schematic elevation of one possible structure according to the invention, with FIG. 1 showing a cover situated above the structure to be covered thereby, with part of the cover being shown in section.

Referring now to the drawings, the structure of the invention which is illustrated therein includes a support means which is easily movable and which includes a plate 10 made of any suitable rigid material such as a suitable plastic, this plate 10 being fixed with vertical partitions 12 and 14 which divide the upper surface of the plate 10 into a number of compartments as illustrated. Thus the partition 12 extends longitudinally along the center of the upper surface of the plate 10 while the partitions 14 extend perpendicularly from the central partition 12 to divide the space at the upper surface of the plate 10 into a number of compartments.

The material utilized for the plate 10 and the partitions 12 and 14 may be, for example, a suitable synthetic resin which is inert with respect to natural secretions of the animal as well as with respect to products for disinfection and maintaining the animal. In the illustrated example the plate 10 is provided with feet 16 and wheels 18, the feet 16 being situated, for example, at the regions of the left corners of the plate 10 while the wheels 18 are situated at the regions of the right corners of the plate 10, as viewed in FIGS. 1 and 2. Thus, by reason of this feature it is easily possible to move the plate 10 and the structure carried thereby to the best possible location.

Moreover, a cover 20 is provided as schematically shown in FIG. 1. This cover 20 may be made, for example, of a transparent plastic. It has a top wall provided with a handle 22. Moreover, at the region of its lower periphery the cover is formed with a series of openings 24 capable of receiving the spring-pressed pivoted catch elements 26 which are carried in a known way by the plate 10 at the periphery thereof. Thus, with an animal situated on the plate 10 it is possible to slip the cover 20 over the plate 10 so that the catches 26 will snap respectively into the openings 24, and in this way it is possible easily to carry about the entire structure with an animal situated therein. Of course the distance of the top wall of the cover 20 from the bottom edge thereof is adequate for the particular animal. In order to remove the cover 20 it is only necessary to depress a pair of the catches 26 such as those at the left in FIGS. 1 and 2, and in this way the left end of the cover 20 can be displaced above the thus-depressed catches 26, the cover having sufficient clearance with respect to the plate 10 for this purpose. Then one or more of the remaining catches 26 can be depressed to enable the entire cover to be removed after the animal with the structure of the invention has been transported to a desired location.

The several modules of the invention, as described below, are of a size which enables them to be respectively situated in the compartments formed at the top of the plate 10 by way of the partitions 12 and 14. The plurality of module means of the invention can have widely varying configurations and purposes, and preferably can be designed to be utilized individually or in combination in a manner which will be apparent from the description which follows.

Thus, for example, one of the module means of the invention can be a "refuge" type of model formed by an enclosure 28 which is closed except for an access opening 30 through which the animal can conveniently travel into and out of the enclosure 28. The size of the opening 30 is preferably made just large enough to permit entry and exit of the particular animal. This enclosure and its entrance and exit opening may be constructed in the manner of a niche or a cage for birds. In the interior of the enclosure there are provided suitable accessories for the comfort of the animal. Thus, for example, in the interior of the enclosure 28 there is a cushion 32 having in its interior an electric heating element 34 shown schematically in FIG. 2 connected into a suitable circuit having batteries 36 and a thermostat 38 as well as a switch 40 which responds to the presence of the animal on the cushion for closing the illustrated circuit and thus causing the cushion to be heated to the temperature set by the thermostat 38. In addition, the interior surface of the enclosure 28 is lined with a sound-deadening material 42 which provides for sound insulation which will minimize noise in the vicinity of the enclosure 28, the sound-deadening material 42 being particularly designed for preventing transmission of ultrasonic wave lengths to which the particular animal may be particularly sensitive.

A further module means, which is not illustrated, may be similar to a nursery and provided with automatic feeding devices and other accessories of appropriate function as well as with means for protecting access to the module.

An additional module means 44 is of the bodily convenience type, of benefit both to the animal and its master, and may include a receptacle 46 containing an absorbent material 48 and partly covered by a cover 50 having a central opening through which the animal has access to the material 48. This cover 50 has a suitable rough upper surface 52 which preferably forms a scratch surface. Thus this scratch surface forms a border surrounding the receptacle 46. In addition there may be provided an unillustrated distributor of a deodorant product for the receptacle 46.

A further unillustrated module also designed for bodily convenience may include a reserve of food and/or beverage contained in a device designed to meter the supply of the food and/or beverage so as to permit access thereto according to a predetermined time program, thus facilitating an extended absence of the master without the risk of overfeeding on the part of the animal.

As is shown in FIGS. 2 and 5, a further module means of the invention fulfills the function of friendship and may be utilized in the case of absence of the master. This module means 54 includes on a suitable supporting plate 56 a recording play-back device 58 in the form, for example, of a suitable tape recorder which plays back the sound which is stored on a tape. When the animal places itself on the plate 56 the animal will depress a plate 60 which will close a circuit 62 schematically shown in FIG. 2, so as to energize the recorder 58 which thus operates to provide for the animal the sound which is stored on the tape. This sound may be a program providing for the animal sounds and/or voices simulating a friendly presence.

Figure 6:
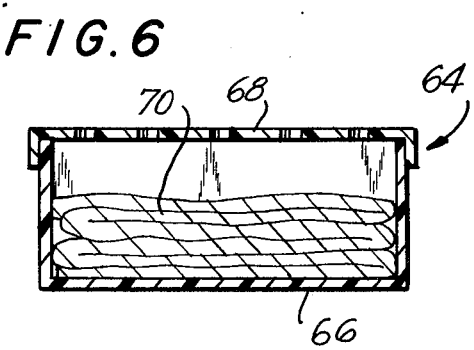

Also, it is possible to provide a module means 64 which, as shown in FIGS. 2 and 6, includes a container 66 having a perforated cover 68 and containing in its interior old linens 70 or other suitable material impregnated with the odor of an absent individual.

The several module means of the invention also include an exercising module means 72 in the form of an endless band 74 guided by rollers 76 which are suitably braked with respect to the shafts 78 on which they turn, the endless band 74 being suitably inclined as illustrated, and if desired the inclination can be rendered adjustable in any suitable way. The surface of the endless band 74 is covered with felt, for example, offering a suitable surface to be engaged by the claws of the animal.

A similar type of unillustrated module may include a ball or other solid decoy connected by a suitable flexible cord or the like to a spring mounted in a suitable socket.

An animated type of module means of the invention may include the module means 80 shown in FIGS. 2 and 3. This module means is formed by a stretchable elastic sheet 82 covering a suitable enclosure 84 in which there are a plurality of mechanisms in the form of plugs or projections 86 which move upwardly to stretch the sheet 82 when certain other projections 86 are depressed by the animal. Thus a plurality of tiltable levers 88 may be supported on suitable pivots in the enclosure 84 and may carry at their ends the plugs 86 so that when one plug 86 is depressed the other will be raised to cause the sheet 82 to project upwardly in an uncontrollable and surprising manner. FIG. 3 schematically illustrates a paw 90 of the animal depressing a part of the sheet so as to depress one projection 86 shown at the left of FIG. 3 so as to cause the projection 86 at the right of FIG. 3 to rise as illustrated.

A further module of this general type may include the module 92 illustrated in FIGS. 2 and 4. This module 92 includes a support plate 94 on which there is turnably supported by way of a suitable central pivot a circular plate 96 carrying a number of figurines 98 simulating different animals. Thus, when the house pet engages the plate 96 or one of the figurines 98, the several figurines will move past the house pet in a haphazard manner. In addition it is possible to provide any projections or the like which serve a similar function to the extent that the faculties of perception and intellectual capacity of the animal permits.

Finally, a module to be utilized all the time by the animal and which is ornamental with respect to the apartment or house may be formed by a house garden or the equivalent thereof planted together with a grassy type of covering.

The several examples referred to above of course are not exhaustive but on the contrary serve only to show clearly the entire concept and combination forming the object of the present invention and serving for all adaptations and accommodations which can contribute toward pleasant cohabitation with a given animal of known or predictable habits in a particular living framework whose primarily artificial character is at least partly minimized by way of the present invention.

In effect, the modular nature of the integrated assembly of the invention and the variety of the modules which can be utilized assure the precise adaptation of the assembly to the capacities and needs of a given animal. A further advantage of the structure of the invention, relating to its transportable character, is that it avoids any trauma with respect to separation of the animal from a given environment in the case of permanent or temporary removal from a given abode. Yet another advantage of the structure of the invention is that it may structurally evolve to the same extent as the growth of the animal.

Finally, and above all, the structure of the invention has the advantage of providing a solution to the conflicts inherent in modern life as a result of the artificiality thereof, while fulfilling the desire to possess a house pet while providing for the house pet at least partially the impression of living in a natural environment. It is of course to be emphasized that this advantage is of benefit not only to the animal but also to the master.

What is claimed is:

1. An integrated assembly for facilitating cohabitation with house pets, particularly cats and dogs, who normally live under semi-free conditions in the lodgings of their master, comprising movable support means and a plurality of module means interchangeably carried by said movable support means for fulfilling a number of functions which include arrangement in available space, provision of bodily conveniences, stimulation of instincts and/or simulation of a presence, with said plurality of module means being selectively combinable for providing for a given house pet specific needs which include territorial refuge, vital comforts, physical and mental exercise, and/or friendship.

2. The combination of claim 1 and wherein said movable support means includes a compartmented plate carrying feet or wheels enabling it to be situated in a desirable location and/or a cover means for removable connection with said plate to provide for transport of the house pet.

3. The combination of claim 2 and wherein said plurality of module means are capable of being situated in compartments of said plate.

4. The combination of claim 1 and wherein one of said module means includes a refuge-forming enclosure formed with an access opening and having in its interior accessories such as a heated cushion and/or sound-insulating means.

5. The combination of claim 1 and wherein one of said module means, for fulfilling the function of bodily convenience, includes a receptacle containing an absorbent substance and having a removable cover formed with an opening surrounded by a border having a scratch surface.

6. The combination of claim 1 and wherein one of said module means, for fulfilling the function of providing exercise, includes an endless band, a pair of braked rollers supporting and guiding said band, and, a band-covering of felt to be engaged by claws.

7. The combination of claim 1 and wherein one of said module means includes a stretchable sheet and beneath the latter a plurality of mechanisms including projections which can be depressed through said sheet and which during operation of said mechanism will push upwardly against said sheet, with said projections being actuated by the house pet.

8. The combination of claim 1 and wherein one of said module means includes a movable support carrying a number of animal figurines and capable of being moved to displace the figurines haphazardly according to the control of the house pet.

9. The combination of claim 1 and wherein one of said module means for fulfilling the function of friendship includes a recording play-back means having thereon sounds and/or voices simulating a friendly presence.

10. The combination of claim 1 and wherein one of said module means for fulfilling the function of friendship includes a perforated enclosure having in its interior objects such as old linens impregnated with the odor of an absent individual.

* * * * *